United States Patent
Cui et al.

(10) Patent No.: US 11,073,940 B2
(45) Date of Patent: Jul. 27, 2021

(54) TOUCH SUBSTRATE, TOUCH DEVICE AND TOUCH DETECTION METHOD

(71) Applicants: MIANYANG BOE OPTOELECTRONICS TECHNOLOGY CO., LTD., Sichuan (CN); BOE TECHNOLOGY GROUP CO., LTD., Beijing (CN)

(72) Inventors: Yingxi Cui, Beijing (CN); Hu Zhang, Beijing (CN); Le Peng, Beijing (CN); Jiang Jing, Beijing (CN); Zhengde Liu, Beijing (CN); Lubiao Sun, Beijing (CN); Yunte Chen, Beijing (CN)

(73) Assignees: Mianyang Boe Optoelectronics Technology Co., Ltd., Sichuan (CN); Boe Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/759,209

(22) PCT Filed: Mar. 28, 2019

(86) PCT No.: PCT/CN2019/080017
§ 371 (c)(1),
(2) Date: Apr. 24, 2020

(87) PCT Pub. No.: WO2020/191696
PCT Pub. Date: Oct. 1, 2020

(65) Prior Publication Data
US 2021/0048936 A1 Feb. 18, 2021

(51) Int. Cl.
*G06F 3/041* (2006.01)
*G06F 3/044* (2006.01)

(52) U.S. Cl.
CPC ........ *G06F 3/04166* (2019.05); *G06F 3/0445* (2019.05); *G06F 3/0446* (2019.05)

(58) Field of Classification Search
CPC .. G06F 3/04166; G06F 3/0445; G06F 3/0446; G06F 3/0443
See application file for complete search history.

(56) References Cited

U.S. PATENT DOCUMENTS 10,152,147 B2 * 12/2018 Choi .................... G06F 3/0446
2010/0149108 A1    6/2010 Hotelling et al.
(Continued)

FOREIGN PATENT DOCUMENTS

| CN | 1073909938 A | 11/2007 |
| CN | 104699339 A  | 6/2015  |

(Continued)

OTHER PUBLICATIONS

International Search Report of PCT/CN2019/080017 and English translation, dated Dec. 19, 2019, 13 pages.

*Primary Examiner* — Michael Pervan
(74) *Attorney, Agent, or Firm* — Muncy, Geissler, Olds & Lowe, P.C.

(57) ABSTRACT

A touch substrate, a touch device and a touch detection method are provided. The touch substrate includes: a base substrate, including a touch region and a trace region surrounding the touch region; multiple sensing electrodes arranged in the touch region; and multiple sensing electrode traces arranged in the trace region and connected to the multiple sensing electrodes respectively. The sensing electrodes includes first sensing electrodes and second sensing electrodes, each first sensing electrode is connected at a first side of the touch region to a sensing electrode trace, and each second sensing electrode is connected at a second side of the touch region opposite to the first side to a sensing electrode trace. In this disclosure, sensing electrodes are connected at two opposite sides of the touch region to the sensing electrode traces, therefore, two sensing electrodes may be (Continued)

scanned each time, shortening a scanning period of the sensing electrodes.

16 Claims, 4 Drawing Sheets

(56) References Cited

U.S. PATENT DOCUMENTS

| | | | |
|---|---|---|---|
| 2014/0139758 A1* | 5/2014 | Jian | ............... G06F 3/0412 349/12 |
| 2017/0371460 A1 | 12/2017 | Xie et al. | |
| 2020/0110498 A1* | 4/2020 | Lee | ............... H01L 27/3276 |

FOREIGN PATENT DOCUMENTS

| CN | 105446547 A | 3/2016 |
|---|---|---|
| CN | 107291303 A | 10/2017 |

* cited by examiner

TOUCH SUBSTRATE, TOUCH DEVICE AND TOUCH DETECTION METHOD

CROSS-REFERENCE TO RELATED APPLICATION

This application is a U.S. national phase application of a PCT Application No. PCT/CN2019/080017 filed on Mar. 28, 2019, a disclosure of which is incorporated herein by reference in its entirety.

TECHNICAL FIELD

The present disclosure relates to the field of touch technology, in particular to a touch substrate, a touch device and a touch detection method.

BACKGROUND

A mutual capacitive touch device includes driving electrodes (TX) arranged in rows or columns and sensing electrodes (RX) arranged in columns or rows and crossing the driving electrodes. A coupling capacitance is generated at an intersection of a driving electrode and a sensing electrode. When the touch device is touched by a finger, the coupling capacitance at a touched position changes, and a change in the coupling capacitance is detected by a touch driving integrated circuit (IC), such that the position touched by the finger may be determined.

Each driving electrode is connected to one driving electrode trace at its periphery and is connected to the touch driving IC via the driving electrode trace; and each sensing electrode is connected to one sensing electrode trace at its periphery and is connected to the touch driving IC via the sensing electrode trace. In the related art, all sensing electrodes of a touch device are connected to the sensing electrode traces respectively at a same side of a touch region of the touch device. In this connection mode, during a process of scanning the sensing electrodes, merely one sensing electrode may be scanned each time.

During the operation of a conventional touch device, a plurality of driving electrodes are scanned successively, and within a scanning duration of each driving electrode, a plurality of sensing electrodes are scanned successively. Assuming that the quantity of the driving electrodes is M and the quantity of the sensing electrodes is N, one scanning period is T1*T2, where T1 represents a scanning time for the M driving electrodes, and T2 represents a scanning time for the N sensing electrodes. The scanning period is relatively long, resulting in a relatively slow touch response and a relatively low sensitivity of the touch device.

SUMMARY

The present disclosure provides in some embodiments a touch substrate, a touch device and a touch detection method, so as to solve the problem in the related art that a scanning period is long due to the fact that merely one sensing electrode is scanned each time in the conventional connection mode of the sensing electrodes and the sensing electrode traces and, as a result, the touch response of the touch device is relatively slow and the sensitivity is relatively low.

In one aspect, the present disclosure provides in some embodiments a touch substrate, including: a base substrate including a touch region and a trace region at a periphery of the touch region; a plurality of sensing electrodes arranged in the touch region; and a plurality of sensing electrode traces arranged in the trace region and connected to the plurality of sensing electrodes in a one-to-one correspondence. The plurality of sensing electrodes includes first sensing electrodes and second sensing electrodes, each first sensing electrode is connected at a first side of the touch region to one of the sensing electrode traces, each second sensing electrode is connected at a second side of the touch region to one of the sensing electrode traces, where the first and second sides are two opposite sides of the touch region.

In a possible embodiment of the present disclosure, when the quantity of the sensing electrodes is an even number, the quantity of the first sensing electrodes is the same as the quantity of the second sensing electrodes.

In a possible embodiment of the present disclosure, when the quantity of the sensing electrodes is an odd number, a difference between the quantity of the first sensing electrodes and the quantity of the second sensing electrodes is 1.

In a possible embodiment of the present disclosure, each first sensing electrode is an odd-numbered sensing electrode in the plurality of sensing electrodes, and each second sensing electrode is an even-numbered sensing electrode in the plurality of sensing electrodes.

In a possible embodiment of the present disclosure, the touch substrate further includes: a plurality of driving electrodes arranged in the touch region in such a manner as to cross and be insulated from the plurality of sensing electrodes; and a plurality of driving electrode traces arranged in the trace region and connected to the plurality of driving electrodes in a one-to-one correspondence, where the plurality of driving electrode traces are disposed in a different layer from the plurality of sensing electrode traces.

In a possible embodiment of the present disclosure, in an area of the trace region where both the sensing electrode traces and the driving electrode traces are arranged, orthogonal projections of at least some of the sensing electrode traces onto the base substrate partially overlap orthogonal projections of the driving electrode traces onto the base substrate.

In a possible embodiment of the present disclosure, the sensing electrodes are in a same layer as the plurality of driving electrodes and are made of a same material as the driving electrodes, and each of the plurality of sensing electrodes or each of the plurality of driving electrodes includes a plurality of conductive patterns arranged in a same layer and separated from each other. The touch substrate further includes a plurality of bridge patterns arranged in the touch region, and an insulation layer provided with connection holes. Each bridge pattern is configured to connect adjacent conductive patterns of the plurality of conductive patterns of a same sensing electrode or driving electrode via one of the connection holes.

In a possible embodiment of the present disclosure, the plurality of bridge patterns are in a same layer as the plurality of sensing electrode traces or the plurality of driving electrode traces and are made of a same material as the plurality of sensing electrode traces or the plurality of driving electrode traces.

In a possible embodiment of the present disclosure, the insulation layer is made of an organic material and has a light transmittance greater than a predetermined threshold.

In another aspect, the present disclosure provides in some embodiments a touch device including the above-mentioned touch substrate and a touch driving IC. A plurality of sensing electrodes of the touch substrate are divided into a plurality of sensing electrode groups, and each sensing electrode group includes one first sensing electrode and one second sensing electrode. The touch driving IC is configured to, within a scanning duration of one driving electrode, apply a sensing signal to and detect the sensing signal from the plurality of sensing electrode groups sequentially. The sensing signal is applied to and detected from the first sensing electrode and the second sensing electrode in a same sensing electrode group simultaneously.

In yet another aspect, the present disclosure provides in some embodiments a touch detection method applied to the above-mentioned touch device. A plurality of sensing electrodes of the touch substrate are divided into a plurality of sensing electrode groups, and each sensing electrode group includes one first sensing electrode and one second sensing electrode. The touch detection method includes: within a scanning duration of one driving electrode, applying a sensing signal to and detecting the sensing signal from the plurality of sensing electrode groups sequentially. The sensing signal is applied to and detected from the first sensing electrode and the second sensing electrode in a same sensing electrode group simultaneously.

In a possible embodiment of the present disclosure, the first sensing electrode and the second sensing electrode in a same sensing electrode group are arranged adjacent to each other.

The present disclosure has the following beneficial effect. According to the embodiments of the present disclosure, different sensing electrodes are connected at opposite sides of the touch region to the sensing electrode traces respectively. In this connection mode, it is able to scan two sensing electrodes each time, thereby shortening a scanning period of the sensing electrodes.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain other embodiments, which also fall within the scope of the present disclosure.

Figure 1:
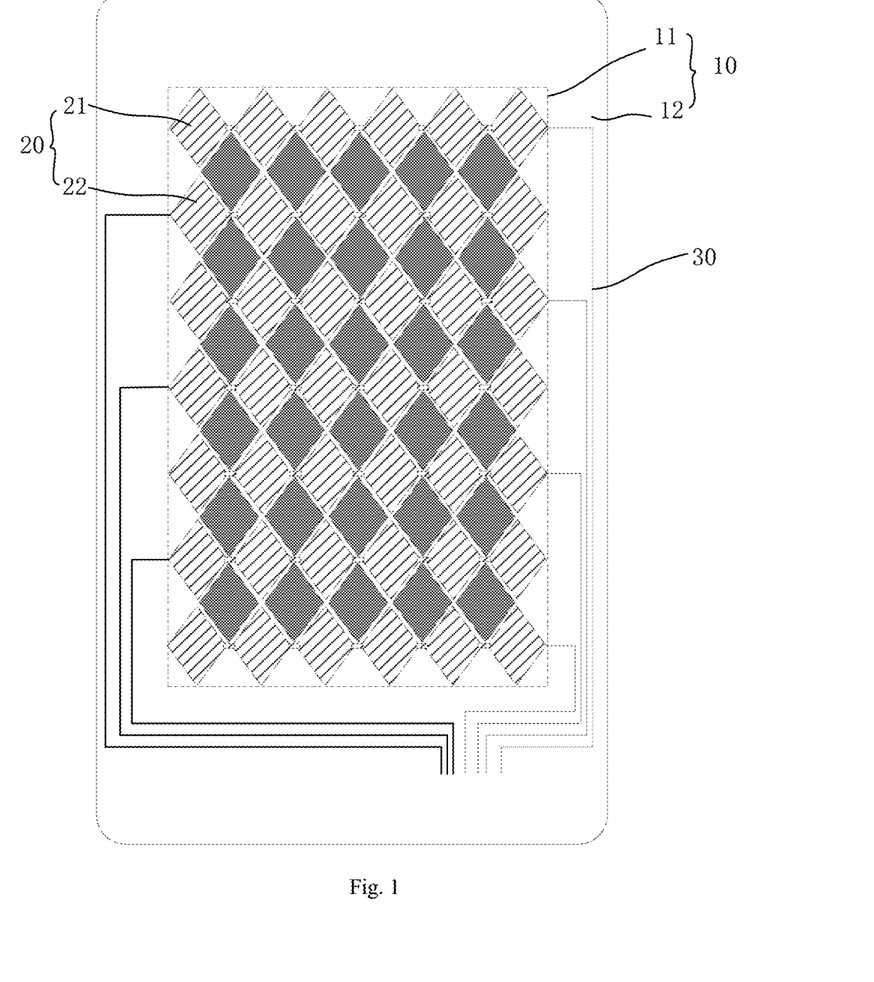
FIG. 1 is a schematic structural view showing a touch substrate according to an embodiment of the present disclosure.

Referring to FIG. 1, a schematic structural view of a touch substrate according to an embodiment of the present disclosure is illustrated. The touch substrate includes: a base substrate 10 including a touch region 11 (indicated by a dotted box in FIG. 1) and a trace region 12 at a periphery of the touch region 11; a plurality of sensing electrodes 20 arranged in the touch region 11; and a plurality of sensing electrode traces 30 arranged in the trace region 12 and connected to the plurality of sensing electrodes 20 in a one-to-one correspondence. The plurality of sensing electrodes 20 includes first sensing electrodes 21 and second sensing electrodes 22, each first sensing electrode 21 is connected at a first side of the touch region 11 to a sensing electrode trace 30, each second sensing electrode 22 is connected at a second side of the touch region 11 opposite to the first side to a sensing electrode trace 30.

In the embodiment as shown in FIG. 1, the plurality of sensing electrodes 20 may be arranged in rows, each first sensing electrode 21 is connected at a right side of the touch region 11 to a sensing electrode trace 30, and each second sensing electrode 22 is connected at a left side of the touch region 11 to a sensing electrode trace 30. In some other embodiments of the present disclosure, the plurality of sensing electrodes 20 may be arranged in columns, each first sensing electrode 21 is connected at an upper side of the touch region 11 to a sensing electrode trace 30, and each second sensing electrode 22 is connected at a lower side of the touch region 11 to a sensing electrode trace 30.

In the embodiments of the present disclosure, some of the sensing electrodes are connected at one side of the touch region to the sensing electrode traces respectively, and the remaining sensing electrodes are connected at the opposite side of the touch region to the sensing electrode traces respectively. In this connection mode, it is able to scan two sensing electrodes each time, thereby shortening a scanning period of the sensing electrodes.

The reason as to why two sensing electrodes may be scanned each time so as to reduce the scanning period will be given as follows. During the touch detection, within a scanning duration of one driving electrode, a sensing signal may be applied to and detected from one first sensing electrode and one second sensing electrode simultaneously. The sensing signal is applied to the first sensing electrode and the second sensing electrode at different sides of the touch region, as a result, at a certain moment, merely the sensing signal applied to one of the first sensing electrode and the second sensing electrode may arrive at a position where the currently-scanned driving electrode is located. In this way, it is able to determine the sensing electrode corresponding to a currently touched position. Since two sensing electrodes may be scanned at the same time, assuming the quantity of the driving electrodes is M and the quantity of the sensing electrodes is N, one scanning period is T1*T2*½, where T1 represents a scanning time of the M driving electrodes, T2*½ represents a scanning time of the N sensing electrodes, and T2 represents a scanning time of the N sensing electrodes in the related art in which one sensing electrode is scanned at a time. It can be seen that, compared with the conventional touch device, the scanning period of the touch substrate in the embodiments of the present disclosure is reduced by half, thereby improving the touch response speed as well as the sensitivity.

In some embodiments of the present disclosure, optionally, when the quantity of the sensing electrodes is an even number, the quantity of the first sensing electrodes is the same as the quantity of the second sensing electrodes. In other words, the quantity of the sensing electrode traces at the first side of the touch region is the same as the quantity of the sensing electrode traces at the second side. In this regard, it is able to conveniently divide the sensing electrodes into groups each consisting of two sensing electrodes. The sensing signal may be applied to and detected from a group of sensing electrodes simultaneously.

In some embodiments of the present disclosure, optionally, when the quantity of the sensing electrodes is an odd number, a difference between the quantity of the first sensing electrodes and the quantity of the second sensing electrodes is 1. In other words, the quantity of the sensing electrode traces at the first side of the touch region is roughly equivalent to the quantity of the sensing electrode traces at the second side. Apart from one sensing electrode, the other sensing electrodes may be divided into groups each consisting of two sensing electrodes. The sensing signal may be applied to and detected from a group of sensing electrodes simultaneously.

In some embodiments of the present disclosure, optionally, each first sensing electrode is an odd-numbered sensing electrode in the plurality of sensing electrodes, and each second sensing electrode is an even-numbered sensing electrode in the plurality of sensing electrodes. In other words, two adjacent sensing electrodes are connected respectively at different sides of the touch region to the touch electrode traces, so the two adjacent sensing electrodes may form a group. The sensing signal may be applied to and detected from a group of sensing electrodes simultaneously. For example, in the embodiment as shown in FIG. 1, the No. 1, No. 3, No. 5 and No. 7 sensing electrodes are the first sensing electrodes, and the No. 2, No. 4 and No. 6 sensing electrodes are the second sensing electrodes.

Figure 2:
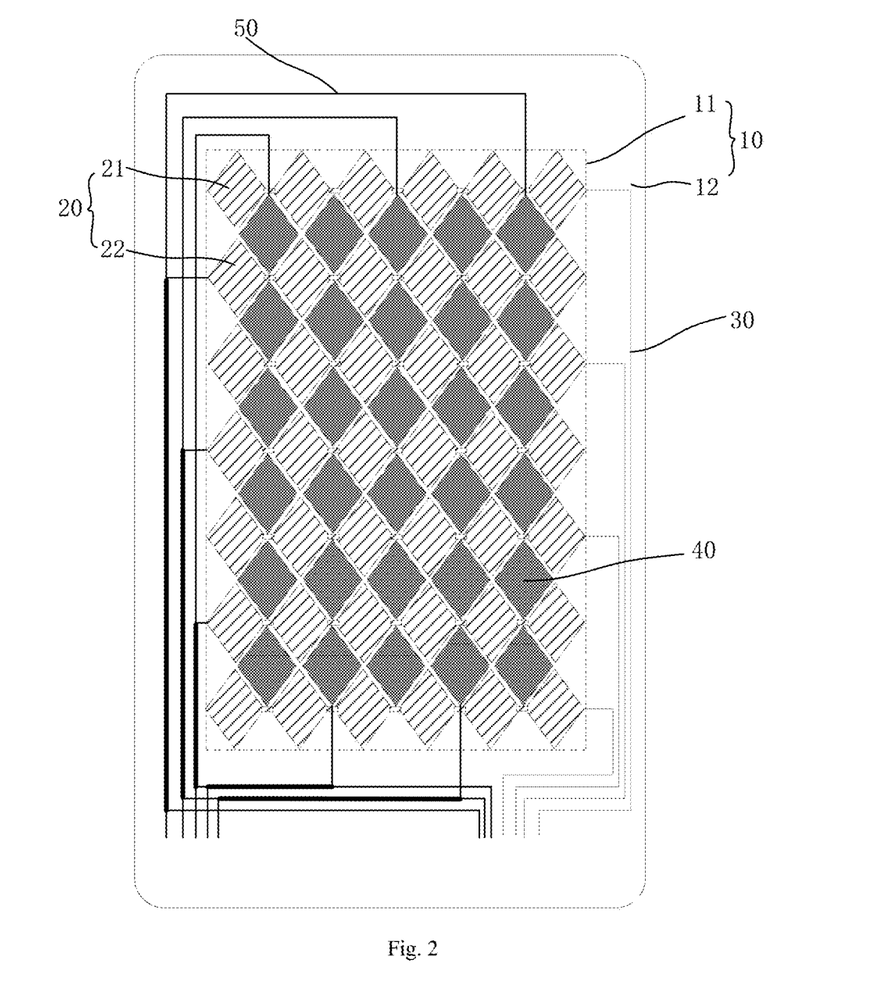
FIG. 2 is another schematic structural view showing a touch substrate according to an embodiment of the present disclosure.

In the embodiments of the present disclosure, the touch substrate may be a mutual capacitive touch substrate. As shown in FIG. 2, apart from the plurality of sensing electrodes 30, the touch substrate may further include: a plurality of driving electrodes 40 arranged in the touch region 11 in such a manner as to cross and be insulated from the sensing electrodes 30; and a plurality of driving electrode traces 50 arranged in the trace region 12 and connected to the plurality of driving electrodes 40 in a one-to-one correspondence, where the plurality of driving electrode traces 50 are disposed in a different layer from the plurality of sensing electrode traces 30.

As shown in FIG. 2, in some embodiments of the present disclosure, optionally, in an area of the trace region 12 where both the sensing electrode traces 30 and the driving electrode traces 50 are arranged (areas of the trace region 12 at a left side and a lower side of the touch region 11 as shown in FIG. 2), orthogonal projections of at least some of the sensing electrode traces 30 onto the base substrate 10 partially overlap orthogonal projections of the driving electrode traces 50 onto the base substrate 10, i.e., a sensing electrode trace 30 may spatially overlap a driving electrode trace 50 in an upper and lower direction. In FIG. 2, a black bold line represents an overlapped portion of the sensing electrode trace 30 and the driving electrode trace 50. In this way, it is able to reduce a width of the corresponding trace region 12, thereby providing a narrow bezel.

In some embodiments of the present disclosure, the sensing electrodes 20 may be arranged at a layer different from the driving electrodes 40 and be insulated from the driving electrodes 40. In the embodiments, the driving electrode traces 50 may be arranged in a same layer as the driving electrodes 40, so as to facilitate the connection and reduce the manufacture cost. In addition, the sensing electrode traces 30 may be arranged in a same layer as the sensing electrodes 20, so as to facilitate the connection and reduce the manufacture cost.

Figure 3:
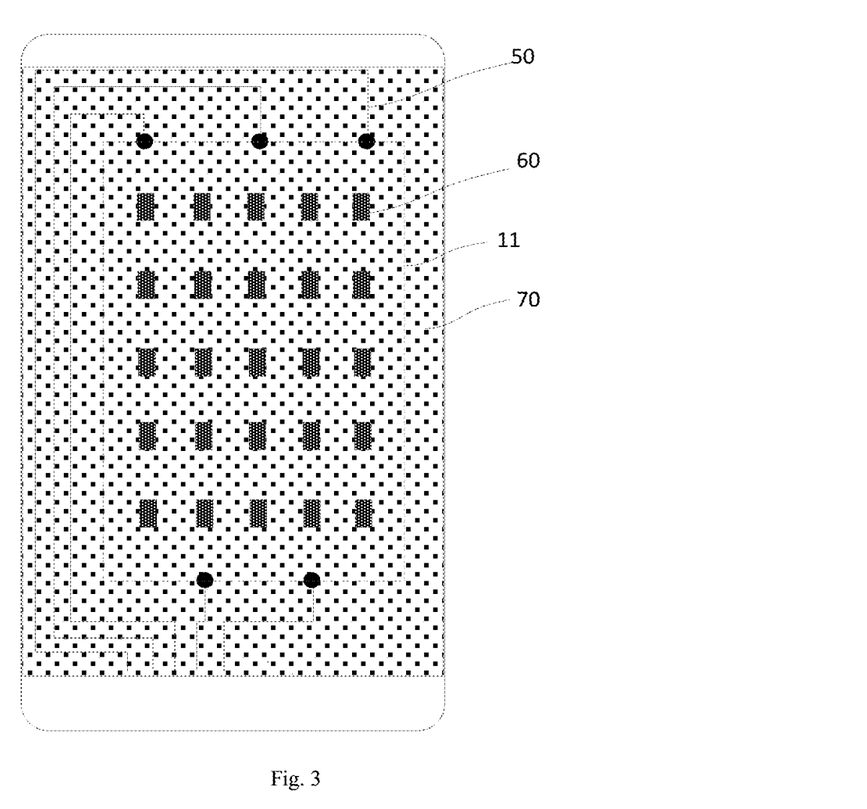
FIG. 3 is yet another schematic structural view showing a touch substrate according to an embodiment of the present disclosure.

In some other embodiments of the present disclosure, the sensing electrodes 20 may also be located in a same layer as the driving electrodes 40 and be made of a same material as the driving electrodes 40, such that the sensing electrodes 20 and the driving electrodes 40 may be formed through a single patterning process, thereby reducing the manufacture cost. Each sensing electrode 20 or each driving electrode 30 includes a plurality of conductive patterns arranged in a same layer and separated from each other. At this time, in order to connect the plurality of conductive patterns of the same sensing electrode 20 or driving electrode 30 that are arranged at the same layer and separated from each other, as shown in FIG. 3, the touch substrate may further include a plurality of bridge patterns 60 arranged in the touch region 11, and an insulation layer 70 provided with connection holes. Each bridge pattern 60 is configured to connect adjacent conductive patterns of the plurality of conductive patterns of the same sensing electrode 20 or driving electrode 40 via one of the connection holes.

In the embodiments of the present disclosure, the bridge pattern 60 may be made of a metallic material, e.g., titanium/aluminum/titanium (Ti/Al/Ti).

Referring to FIG. 2, in the embodiment as shown in FIG. 2, the sensing electrodes 20 and the driving electrodes 40 are in a same layer and are made of a same material. Each sensing electrode 20 includes a plurality of conductive patterns arranged in a same layer and connected successively, while each driving electrode 40 includes a plurality of conductive patterns arranged in a same layer and separated from each other, and the plurality of conductive patterns of the same driving electrode 40 are connected to each other via the bridge patterns. Of course, in some other embodiments of the present disclosure, each driving electrode 40 may include a plurality of conductive patterns arranged in the same layer and connected successively, while each sensing electrode 20 may include a plurality of conductive patterns arranged in the same layer and separated from each other, and the plurality of conductive patterns of the same sensing electrode 20 may be connected to each other via the bridge patterns.

In some embodiments of the present disclosure, optionally, the bridge patterns 60 are in a same layer as the sensing electrode traces 30 or the driving electrode traces 50, and are made of a same material as the sensing electrode traces 30 or the driving electrode traces 50, such that the bridge patterns and the electrode traces may be formed through a single patterning process, thereby reducing the manufacture cost. Referring to the embodiment as shown in FIG. 3, the bridge patterns 60 and the driving electrode traces 50 are in the same layer and are made of a same material.

In some embodiments of the present disclosure, optionally, the insulation layer 70 is made of an organic material and has a light transmittance greater than a predetermined threshold, e.g., 85%. When the organic material is silicon nitride (SiNx), the light transmittance may be up to 96%. In this way, it is able to improve the light transmittance of the touch substrate. In addition, the organic material has excellent flexibility and bendability, so it is able to provide a flexible touch substrate.

The present disclosure further provides in some embodiments a touch device which includes the above-mentioned touch substrate and a touch driving IC. A plurality of sensing electrodes of the touch substrate may be divided into a plurality of sensing electrode groups, and each sensing electrode group includes one first sensing electrode and one second sensing electrode. The touch driving IC is configured to, within a scanning duration of one driving electrode, apply a sensing signal to and detect the sensing signal from the plurality of sensing electrode groups sequentially. For the same sensing electrode group, the sensing signal may be applied to and detected from the first sensing electrode and the second sensing electrode in the sensing electrode group simultaneously.

In the embodiments of the present disclosure, the sensing signal is applied to the first sensing electrode and the second sensing electrode at different sides of the touch region, as a result, at a certain moment, merely the sensing signal applied to one of the first sensing electrode and the second sensing electrode may arrive at a position where the currently-scanned driving electrode is located. In this way, it is able to determine the sensing electrode corresponding to a currently touched position. Since two sensing electrodes may be scanned at the same time, assuming the quantity of the driving electrodes is M and the quantity of the sensing electrodes is N, one scanning period is T1*T2*½, where T1 represents a scanning time of the M driving electrodes, T2*½ represents a scanning time of the N sensing electrodes, and T2 represents a scanning time of the N sensing electrodes in the related art in which one sensing electrode is scanned at a time. It can be seen that, compared with the conventional touch device, the scanning period of the touch substrate in the embodiments of the present disclosure is reduced by half, thereby improving the touch response speed as well as the sensitivity.

In the embodiments of the present disclosure, the touch driving IC is further configured to apply a driving signal to the plurality of driving electrodes sequentially, and a duration of applying the driving signal to one driving electrode is the scanning duration of the driving electrode.

In the embodiments of the present disclosure, the touch device may be an On-cell touch device, In-cell touch device, One Glass Solution (OGS) touch device, or the like.

The present disclosure further provides in some embodiments a touch detection method applied to the above-mentioned touch device. A plurality of sensing electrodes of the touch substrate are divided into a plurality of sensing electrode groups, and each sensing electrode group includes two sensing electrodes, in which one sensing electrode is the first sensing electrode and the other is the second sensing electrode. The touch detection method may include: within a scanning duration of one driving electrode, applying a sensing signal to and detecting the sensing signal from the plurality of sensing electrode groups sequentially. For the same sensing electrode group, the sensing signal may be applied to and detected from the first sensing electrode and the second sensing electrode in the sensing electrode group simultaneously.

Optionally, the two sensing electrodes in the same sensing electrode group are arranged adjacent to each other.

The present disclosure further provides in some embodiments a method for manufacturing a touch substrate, including: providing a base substrate including a touch region and a trace region at a periphery of the touch region; and forming a plurality of sensing electrodes and a plurality of sensing electrode traces on the base substrate. The plurality of sensing electrodes are arranged in the touch region, and the plurality of sensing electrode traces are arranged in the trace region and connected to the plurality of sensing electrodes in a one-to-one correspondence. The plurality of sensing electrodes include first sensing electrodes and second sensing electrodes, each first sensing electrode is connected at a first side of the touch region to one of the sensing electrode traces, each second sensing electrode is connected at a second side of the touch region to one of the sensing electrode traces, where the first and second sides are two opposite sides of the touch region.

Optionally, the method may further include: forming a plurality of driving electrodes on the base substrate while forming the plurality of sensing electrodes and the plurality of sensing electrode traces on the base substrate, where the plurality of driving electrodes are arranged in the touch region in such a manner as to cross and be insulated from the plurality of sensing electrodes, the sensing electrodes and the driving electrodes are in a same layer and are made of a same material, each sensing electrode or each driving electrode including a plurality of conductive patterns arranged in a same layer and separated from each other; forming an insulation layer on the base substrate, the insulation layer covering the sensing electrodes and the driving electrodes and provided with connection holes; and forming a plurality of bridge patterns and a plurality of driving electrode traces on the base substrate, where the plurality of driving electrode traces are arranged in the trace region and connected to the plurality of driving electrodes in a one-to-one correspondence, the plurality of driving electrode traces are arranged at a layer different from the sensing electrode traces, and each bridge pattern is configured to connect two adjacent conductive patterns of a same driving electrode via one of the connection holes.

As shown in FIG. 4-FIG. 9, schematic process diagrams showing a manufacture method of the touch substrate according to an embodiment of the present disclosure are illustrated. The manufacture method includes the following steps.

Figure 4:
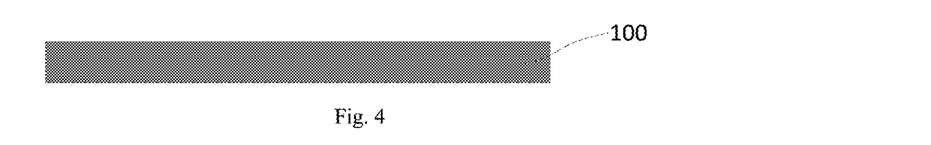
FIG. 4-FIG. 9 are schematic process diagrams showing a manufacture method of the touch substrate according to an embodiment of the present disclosure.

Step 101: as shown in FIG. 4, forming a first metal layer 100. In the embodiments of the present disclosure, the first metal layer 100 may be made of Ti/Al/Ti.

Figure 5:
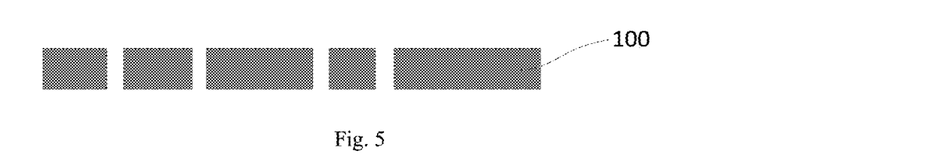

Step 102: as shown in FIG. 5, patterning the first metal layer 100 through a photolithographic process, so as to form the bridge patterns and patterns of the driving electrode traces (the bridge patterns and the driving electrode traces are not shown in FIG. 5). The photolithographic process may include steps such as the application of a photoresist, exposure, development and etching.

Figure 6:
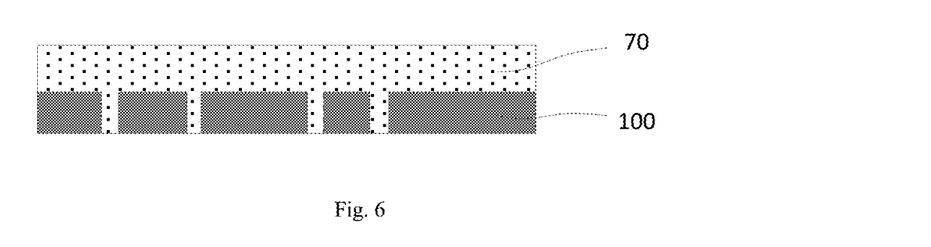

Step 103: as shown in FIG. 6, depositing the insulation layer 70. In the embodiments of the present disclosure, the insulation layer may be made of an organic material.

Figure 7:
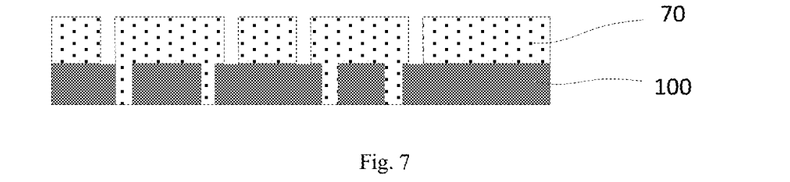

Step 104: as shown in FIG. 7, patterning the insulation layer 70 through a photolithographic process, so as to form the connection holes penetrating through the insulation layer.

Figure 8:
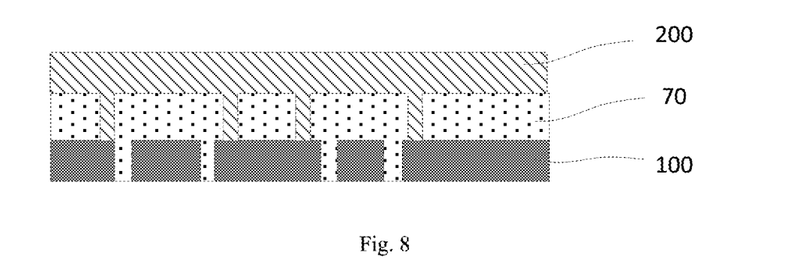

Step 105: as shown in FIG. 8, forming a second metal layer 200. In the embodiments of the present disclosure, the second metal layer 200 may be made of Ti/Al/Ti.

Figure 9:
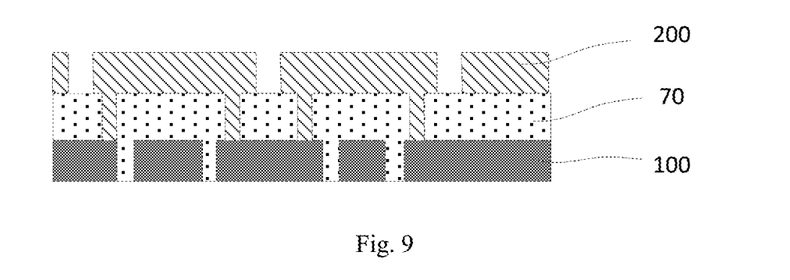

Step 106: as shown in FIG. 9, patterning the second metal layer 200 through a photolithographic process, so as to form patterns of the driving electrodes, the sensing electrodes and the sensing electrode traces. Each driving electrode includes a plurality of conductive patterns arranged in a same layer and separated from each other. The conductive patterns of a same driving electrode may be connected to each other through the bridge patterns under the insulation layer 70 and the connection holes in the insulation layer. In addition, each driving electrode is connected to the driving electrode trace via the connection hole.

Unless otherwise defined, any technical or scientific term used herein shall have the common meaning understood by a person of ordinary skills. Such words as "first" and "second" used in the specification and claims are merely used to differentiate different components rather than to represent any order, quantity or priority. Such words as "connect/connected to" or "couple/coupled to" may include electrical connection, direct or indirect, rather than to be limited to physical or mechanical connection. Such words as "upper", "lower", "left" and "right" are merely used to represent relative position relationship, and when an absolute position of the described object is changed, the relative position relationship will be changed too.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A touch substrate, comprising:
a base substrate, comprising a touch region and a trace region at a periphery of the touch region;
a plurality of sensing electrodes arranged in the touch region, wherein each sensing electrode extends in a first direction;
a plurality of sensing electrode traces arranged in the trace region and connected to the plurality of sensing electrodes in a one-to-one correspondence;
a plurality of driving electrodes arranged in the touch region in such a manner as to cross and be insulated from the plurality of sensing electrodes; and
a plurality of driving electrode traces arranged in the trace region and connected to the plurality of driving electrodes in a one-to-one correspondence,
wherein the plurality of sensing electrodes comprises first sensing electrodes and second sensing electrodes, each first sensing electrode is connected at a first side of the touch region to one of the sensing electrode traces, each second sensing electrode is connected at a second side of the touch region to one of the sensing electrode traces that is different from the sensing electrode traces connected to the first sensing electrodes, wherein the first and second sides are two opposite sides of the touch region, and
wherein the plurality of driving electrode traces are disposed in a different layer from the plurality of sensing electrode traces, and in an area of the trace region where both the sensing electrode traces and the driving electrode traces are arranged, orthogonal projections of at least some of the sensing electrode traces onto the base substrate partially overlap orthogonal projections of the driving electrode traces onto the base substrate.

2. The touch substrate according to claim 1, wherein the plurality of driving electrodes comprises first driving electrodes and second driving electrodes, each first driving electrode is connected at a third side of the touch region to one of the driving electrode traces, each second driving electrode is connected at a fourth side of the touch region to one of the driving electrode traces that is different from the driving electrode traces connected to the first driving electrodes, wherein the third and fourth sides are two opposite sides of the touch region that are different from the first and second sides.

3. A touch device, comprising the touch substrate according to claim 2 and a touch driving integrated circuit (IC), wherein a plurality of sensing electrodes of the touch substrate are divided into a plurality of sensing electrode groups, and each sensing electrode group comprises one first sensing electrode and one second sensing electrode, wherein the touch driving IC is configured to, within a scanning duration of one driving electrode, apply a sensing signal to and detect the sensing signal from the plurality of sensing electrode groups sequentially, wherein the sensing signal is applied to and detected from the first sensing electrode and the second sensing electrode in a same sensing electrode group simultaneously.

4. The touch substrate according to claim 1, wherein the plurality of sensing electrodes are in a same layer as the plurality of driving electrodes and are made of a same material as the plurality of driving electrodes, and each of the plurality of sensing electrodes or each of the plurality of driving electrodes comprises a plurality of conductive patterns arranged in a same layer and separated from each other, wherein the touch substrate further comprises a plurality of bridge patterns arranged in the touch region and an insulation layer provided with connection holes, and each bridge pattern is configured to connect adjacent conductive patterns of the plurality of conductive patterns of a same sensing electrode or driving electrode via one of the connection holes.

5. The touch substrate according to claim 4, wherein the plurality of bridge patterns are in a same layer as the plurality of sensing electrode traces or the plurality of driving electrode traces and are made of a same material as the plurality of sensing electrode traces or the plurality of driving electrode traces.

6. A touch device, comprising the touch substrate according to claim 5 and a touch driving integrated circuit (IC), wherein a plurality of sensing electrodes of the touch substrate are divided into a plurality of sensing electrode groups, and each sensing electrode group comprises one first sensing electrode and one second sensing electrode, wherein the touch driving IC is configured to, within a scanning duration of one driving electrode, apply a sensing signal to and detect the sensing signal from the plurality of sensing electrode groups sequentially, wherein the sensing signal is applied to and detected from the first sensing electrode and the second sensing electrode in a same sensing electrode group simultaneously.

7. The touch substrate according to claim 4, wherein the insulation layer is made of an organic material and has a light transmittance greater than a predetermined threshold.

8. A touch device, comprising the touch substrate according to claim 7 and a touch driving integrated circuit (IC), wherein a plurality of sensing electrodes of the touch substrate are divided into a plurality of sensing electrode groups, and each sensing electrode group comprises one first sensing electrode and one second sensing electrode, wherein the touch driving IC is configured to, within a scanning duration of one driving electrode, apply a sensing signal to and detect the sensing signal from the plurality of sensing electrode groups sequentially, wherein the sensing signal is applied to and detected from the first sensing electrode and the second sensing electrode in a same sensing electrode group simultaneously.

9. A touch device, comprising the touch substrate according to claim 4 and a touch driving integrated circuit (IC), wherein a plurality of sensing electrodes of the touch substrate are divided into a plurality of sensing electrode groups, and each sensing electrode group comprises one first sensing electrode and one second sensing electrode, wherein the touch driving IC is configured to, within a scanning duration of one driving electrode, apply a sensing signal to and detect the sensing signal from the plurality of sensing electrode groups sequentially, wherein the sensing signal is applied to and detected from the first sensing electrode and the second sensing electrode in a same sensing electrode group simultaneously.

10. The touch substrate according to claim 1, wherein in case that a quantity of the sensing electrodes is an even number, a quantity of the first sensing electrodes is the same as a quantity of the second sensing electrodes.

11. The touch substrate according to claim 10, wherein each of the first sensing electrodes is an odd-numbered sensing electrode in the plurality of sensing electrodes, and each of the second sensing electrodes is an even-numbered sensing electrode in the plurality of sensing electrodes.

12. The touch substrate according to claim 1, wherein in case that a quantity of the sensing electrodes is an odd number, a difference between a quantity of the first sensing electrodes and a quantity of the second sensing electrodes is 1.

13. The touch substrate according to claim 12, wherein each of the first sensing electrodes is an odd-numbered sensing electrode in the plurality of sensing electrodes, and each of the second sensing electrodes is an even-numbered sensing electrode in the plurality of sensing electrodes.

14. A touch device, comprising the touch substrate according to claim 1 and a touch driving integrated circuit (IC), wherein a plurality of sensing electrodes of the touch substrate are divided into a plurality of sensing electrode groups, and each sensing electrode group comprises one first sensing electrode and one second sensing electrode, wherein the touch driving IC is configured to, within a scanning duration of one driving electrode, apply a sensing signal to and detect the sensing signal from the plurality of sensing electrode groups sequentially, wherein the sensing signal is applied to and detected from the first sensing electrode and the second sensing electrode in a same sensing electrode group simultaneously.

15. A touch detection method, applied to the touch device according to claim 14, wherein a plurality of sensing electrodes of the touch substrate are divided into a plurality of sensing electrode groups, and each sensing electrode group comprises one first sensing electrode and one second sensing electrode, wherein the touch detection method comprises: within a scanning duration of one driving electrode, applying a sensing signal to and detecting the sensing signal from the plurality of sensing electrode groups sequentially, wherein the sensing signal is applied to and detected from the first sensing electrode and the second sensing electrode in a same sensing electrode group simultaneously.

16. The touch detection method according to claim 15, wherein the first sensing electrode and the second sensing electrode in a same sensing electrode group are arranged adjacent to each other.

* * * * *